Jan. 21, 1941.   J. E. BEGGS   2,229,436
METHOD OF MAKING METAL-ENCLOSED VACUUM TUBES
Filed Sept. 21, 1940   2 Sheets—Sheet 1
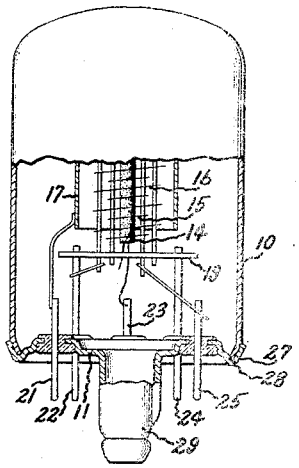
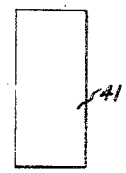
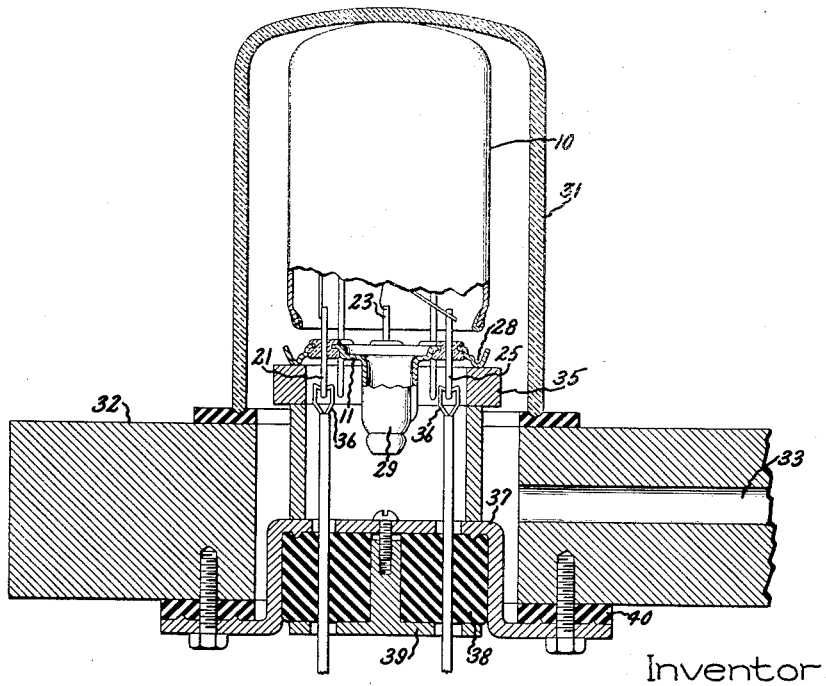
Inventor:
James E. Beggs,
by Harry E. Dunham
His Attorney.

Jan. 21, 1941.   J. E. BEGGS   2,229,436
METHOD OF MAKING METAL-ENCLOSED VACUUM TUBES
Filed Sept. 21, 1940   2 Sheets-Sheet 2
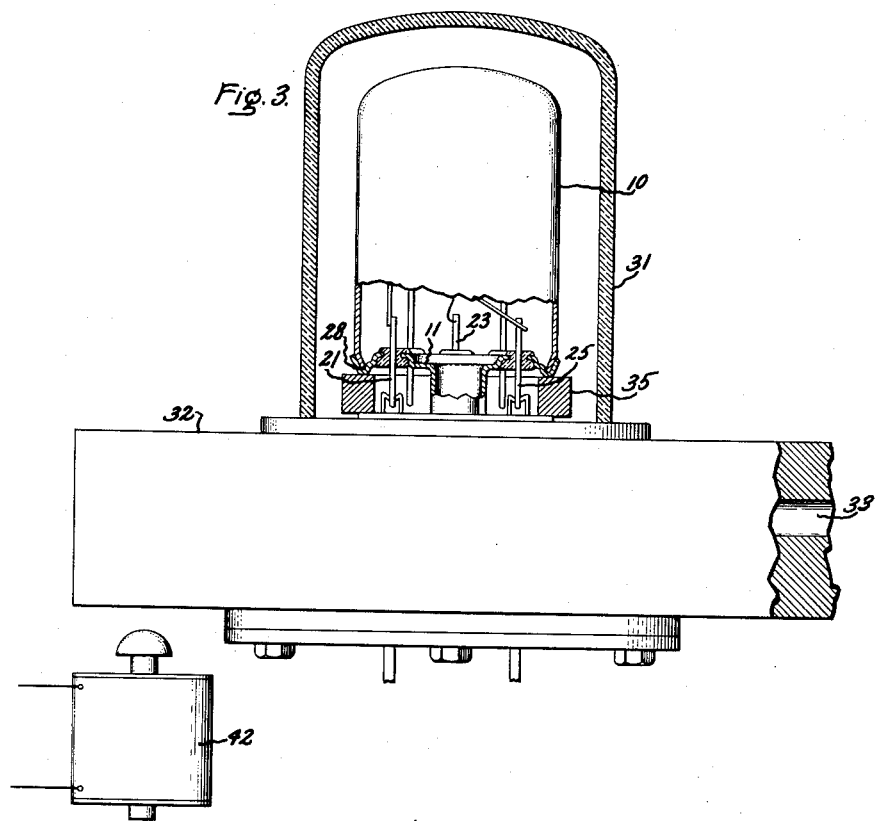
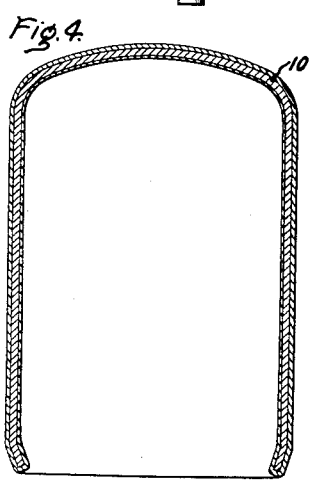
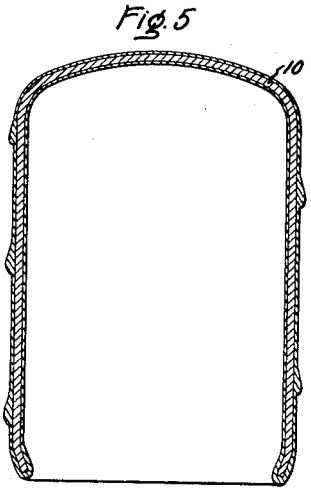
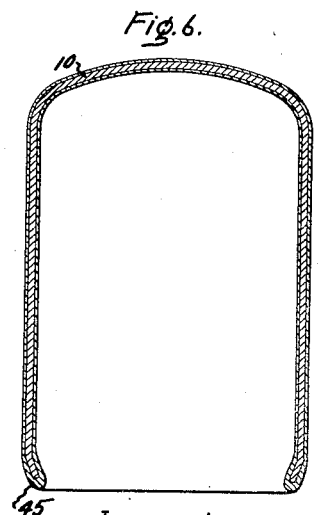
Inventor:
James E. Beggs,
by Harry E. Dunham
His Attorney.

Patented Jan. 21, 1941

2,229,436

UNITED STATES PATENT OFFICE 2,229,436

METHOD OF MAKING METAL-ENCLOSED VACUUM TUBES

James E. Beggs, Scotia, N. Y., assignor to General Electric Company, a corporation of New York Application September 21, 1940, Serial No. 357,776

5 Claims. (Cl. 250—27.5)

This application is a continuation in part of my copending application S. N. 266,558, filed April 7, 1939, and assigned to the General Electric Company.

The aforesaid application describes an improved form of vacuum tube in which the tube envelope comprises two steel parts hermetically joined by soldering. The present invention relates to a method of making such a tube.

In the fabrication of a soldered tube construction of the type above specified it is desirable for several reasons to use tin as a soldering agent. However, the satisfactory application of this metal requires that the surfaces to which it is applied be well-cleaned and free of oxide deposits. In connection with the use of steel tube parts, this consideration presents a special difficulty in that the removal of the iron oxides which are inevitably formed during the manipulation of the parts requires a rather drastic treatment, involving subjecting the parts to strong acids and the like. This treatment is particularly objectionable in the fabrication of vacuum tubes in that the lead-in seals of such tubes, being necessarily formed before the soldering process, tend to be chemically attacked by the cleaning solutions used for the removal of iron oxides.

The foregoing difficulties are overcome in accordance with my present invention by copper plating at least the seal-bearing tube parts before the seals are formed. This not only assists the formation of the seals but also makes it possible subsequently to clean the surface of the copper plating sufficiently to permit the adherence of solder by a relatively mild treatment which is not harmful to the seals.

Another important aspect of the invention consists in the provision of an improved procedure for supplying the soldering agent at the joint between the tube parts. This is accomplished according to a preferred method by plating tin as a uniform coating on the main part of the tube envelope and thereafter producing a partial fluxing of the plated tin by the application of heat to cause its accumulation at the intended joint in an amount sufficient to enable a satisfactory bond to be made.

The features which I desire to protect herein are pointed out with particularity in the appended claims. The invention itself, together with further objects and advantages thereof, may best be understood by reference to the following description taken in connection with the drawings in which Fig. 1 represents a longitudinal sectional view of a completed vacuum tube of the type to which the invention is applicable; Fig. 2 is a view showing an intermediate step in the fabrication of the tube of Fig. 1; Fig. 3 is another view showing the tube of Fig. 2 in a more advanced stage of fabrication; and Figs. 4, 5, and 6 illustrate an alternative mode of procedure with respect to the provision of a sealing agent at the edge of the tube shell.

Referring particularly to Fig. 1 there is shown a metal envelope 10 which is closed at its lower end by means of a metal header 11. The envelope encloses electrode structure including a cathode 14, a control grid 15, a screen grid 16 and an anode 17, these being arranged in the order named and being insulatingly supported by means of a transverse insulating disk 19 consisting, for example, of mica. The electrodes are supplied with current by being respectively connected to a series of lead-in conductors (numbered 21 to 25 inclusive) which are supported in openings in the header 11 by separate bodies of fused vitreous material.

The envelope comprises a seamless cup-like metal shell consisting of steel of the grade sold commercially as "black iron" and is preferably on the order of 10 mils in thickness. At its lower end the shell is inwardly tapered. The header 11 is also of one-piece steel construction and is provided at its outer periphery with an inclined flange 27 which is shaped to conform snugly to the outer surface of the tapered end of the shell 10. This flange is provided near its inner periphery with a shallow circumferentially extending trough 28 which is adapted to receive the extreme edge of the shell. The central portion of the header comprises a downwardly extending tubulation 29 which constitutes a seamless integral extension of the metal of the header itself and which is formed from the header by a succession of deep-drawing operations. The main function of this tubulation is that of a guide pin for facilitating the orientation of the tube in a cooperating socket. It also serves as a means for electrostatically shielding the lead-in conductor 21 of the anode from the diametrically opposite control grid conductor 25.

In the fabrication of a tube of the character described, the header 11 (minus the seals) is first plated with copper to a thickness of about .0008 to .0013 inch. This may be done, for example, by electrolytic means. Thereafter, lead-in conductors which have been previously beaded with glass are positioned in the header openings and a sufficient quantity of heat applied to fuse the glass. Using an iron-matching glass such as one of the glasses described in application S. N. 266,604 of A. W. Hull and Louis Navias (filed April 7, 1939) a temperature of at least 500° C. is required for fusion. The operation above referred to is carried out in air and, at the temperature specified, produces strong oxidation of the header surfaces.

For the purpose of joining the parts of the tube envelope it is found desirable to use a tin solder because of the fact that this metal displays little tendency to vaporize and thus to contaminate the electrode structures and mountings. Moreover, the low melting point of tin (about 230°) means that the soldering operation can be carried out at a temperature below about 300° so that there is little danger of melting the header seals or of cracking them because of excessive thermal expansion.

On the other hand, tin can be satisfactorily applied as a soldering agent only if the surfaces to which it is to adhere are perfectly free from dirt and oxides. Iron parts, for example, can be adequately conditioned in this respect only by "pickling" in strong acids and the like. This latter procedure can be used very well in connection with the envelope shell 10. On the other hand, subjecting the header 11 to a cleaning solution strong enough to remove iron oxide is found to produce etching of the lead-in seals or dissolution of the bond between the glass and metal surfaces to a degree which renders the seals unsatisfactory for commercial purposes.

By copper plating the header to a substantial thickness, as previously specified, assurance is given that the only oxide formed on the header surfaces during formation of the lead-in seals will be copper oxide. In contradistinction to iron oxide, this oxide may be removed by immersion in a cleaning agent which does not affect the glass seals to any detectable degree. For example, one may use in this connection a eutectic flux of zinc chloride and ammonium chloride (about three parts of zinc chloride to one part of ammonium chloride). This procedure (i. e. copper plating and subsequently removing copper oxide by a relatively mild cleaning solution) avoids injury to the lead-in seals and at the same time leaves the header in satisfactory condition for a tinning operation.

In preparing the tube parts for joining, the header (after cleaning) is preferably tinned in its entirety by being immersed in molten tin. The shell 10 may then be conditioned for sealing to the header by dipping its open end in molten tin.

In carrying out the sealing operation (which is, of course, preceded by the act of securing the electrode assembly to the lead-in conductor) the shell 10 and the header 11 are preferably enclosed in a sealed housing 31 as indicated in Fig. 2. The housing 31 is supported from a base structure 32, a deformable gasket being interposed between the parts 31 and 32 to permit the formation of an air-tight joint between them. A duct 33 formed in the body of the base structure 32 permits the space enclosed by the housing 31 to be evacuated. To this end the duct 33 is assumed to connect with a vacuum pump (not shown). With the arrangement illustrated the header 11 is supported within the enclosure 31 by means of an annular mounting block 35 preferably of magnetic character which is suitably supported from the base structure. The various lead-in conductors projecting through the header 11 are engaged by separate contact terminals 36 which permit such energization of the tube electrodes as may be required during the evacuating process. Current supply conductors for the contact terminals 36 extend into the vacuum chamber through a metal closure member 37 from which they are separated by means of a body of deformable insulating material 38, this material being held under compression by means of a clamping element 39. A deformable gasket 40 affords a gas-tight joint between the closure member 37 and the base structure 32.

While the evacuating procedure is going on, the metal shell 10 is supported above the header 11 and in spaced relation with respect to it by the action of a magnet 41 arranged outside the housing 31. With the parts in the relation shown, the shell 10 and the electrode structure enclosed thereby are heated to a degassing temperature by inductive means (not shown), and the housing is thoroughly evacuated through the duct 33. The relatively large gap which exists between the parts 10 and 11 during this period permits the interior of the tube to be thoroughly exhausted. This gap also permits the shell 10 to be heated selectively to a temperature of at least 900° C. without simultaneously heating the header 11 to a temperature high enough to crack the lead-in seals because of thermal expansion or to melt the vitreous material of which the seals are constituted. Preferably the header is held below about 300° C. during the exhaust procedure, the maintenance of this low temperature being facilitated by the continuous loss of heat which occurs through the magnetic mounting block 35 with which the header 11 is in heat-exchanging contact.

After the exhaust procedure, and with the shell 10 still in heated condition, the shell is dropped down to permit its engagement with the header 11 as shown in Fig. 3, this being accomplished either by removal or deenergization of the magnet 41. While the conforming tapers of the shell and header facilitate their engagement in the desired relationship, this engagement may be expedited by vibrating the parts as by subjecting the base structure 32 to a series of hammer-like impacts—for instance, by means of a solenoid-operated mechanism 42 provided for that purpose. The magnetic mounting block 35 prevents the header 11 from bouncing around during this period.

The residual heat of the shell 10 assures that the header 11 shall be raised substantially in temperature as soon as the shell comes in contact with it. This heating is sufficient to effect fusion of the tinned surface of the header with the tin solder adhering to the extremity of the shell. The presence in the header of the trough 28 not only assists in the formation of a good seal at the extreme edge of the shell 10 but also prevents surplus solder from flowing over the surface of the header into regions where its presence might prove objectionable.

A variation of the foregoing procedure which is considered especially advantageous consists in the step of providing the entire shell 10 with a relatively thin uniform coating of tin rather than forming a deposit of tin solder at the edge of the shell as described in the foregoing. This may be done in one way by subjecting the shell to an electrolytic tinning process effective to produce on the outer surface of the shell a uniform plating of tin on the order of a few mils in thickness. It is found that when a shell which is plated in this way is heated to a high temperature, as it is, for example, during the exhaust procedure illustrated in Fig. 2, sufficient flowing of the tin will occur to result in the creation of a relatively heavy deposit of tin at the lower edge of the shell. The accumulation of tin formed in this way proves sufficient to produce a satisfactory joint between the shell and the tinned header 11 when these two parts are brought into contact in the manner indicated in Fig. 3.

The process just referred to may be better understood by referring to Figs. 4, 5, and 6 which respectively illustrate a tube shell at various stages of the tinning operation. Fig. 4 shows the shell as it appears immediately after a plating operation, when it is observed to have a relatively thick coating of tin on its outer surface and a relatively thinner coating of tin on its inner surface. During heating of the shell in the course of the exhaust procedure, the excess tin on the outer surface of the shell flows toward its lower edge as indicated in Fig. 5, finally accumulating in a relatively heavy deposit at the extremity of the shell as shown at 45 in Fig. 6. In this latter condition the shell, which still retains a thin coating of tin or both its outer and inner surfaces, is ready for fusion to the header of the tube.

It is an advantage of the procedure just outlined that it eliminates a separate solder applying step and that it leaves the finished shell with a corrosion proof surface which is of good appearance and which permits the tube to be marketed without additional processing, if desired.

While I have described my invention by reference to a particular order of procedure, it will be understood that numerous changes may be made in this respect without actually departing from the invention. I therefore aim in the appended claims to cover all equivalent variations which come within the true spirit and scope of the foregoing disclosure.

What I claim as new and desire to secure by Letters Patent of the United States is:

1. The method of fabricating a sealed electrical device which in finished condition includes two container-forming iron parts assembled in vacuum-tight relation and having lead-in conductors sealed through one of the parts, which method comprises copper plating at least the said one of the parts, sealing the lead-in conductors through the said part by applying fusible vitreous material while maintaining the part at a temperature of at least 500° C. in air, removing the copper oxide formed on the said part during the sealing operation, and joining the said two parts by fusing between them a metallic solder having a melting point on the order of 200° C.

2. The method of fabricating a sealed electrical device which in completed form includes two conductor-forming iron parts assembled in vacuum-tight relation and having lead-in conductors sealed through one of the parts, which method comprises copper plating at least the said one of the parts, sealing the lead-in conductors through the said part by applying fusible vitreous material while maintaining the part in air at a temperature at least as high as the fusion temperature of such material, removing the copper oxide formed on the said part during the sealing operation by immersing the part in a liquid bath adapted to dissolve said oxide, and joining the said two parts by fusing between them a soldering material consisting mainly of tin, the fusing operation involving heating the said one part to a temperature not greatly in excess of the fusion temperature of tin.

3. The method of fabricating a sealed electrical device which in finished condition includes an envelope shell, a basic header joined to the shell and lead-in conductors sealed through the said header, which method comprises copper plating the header, sealing the lead-in conductors through the header by applying fusible vitreous material while maintaining the part in air at a temperature on the order of 500° C., chemically removing the copper oxide formed on the said part during the sealing operation, electrolytically plating the shell with a coating of tin, heating the shell to a temperature in excess of the fusion temperature of tin, and joining the header and shell by bringing the heated shell into abutting contact with the said header to permit the adherence of the fused tin of the shell coating to the surface of the header.

4. The method of fabricating a sealed electrical device which in completed form includes an envelope shell, a base header joined to the shell and lead-in conductors sealed through the header, which method comprises copper plating the said header, sealing the lead-in conductors through the header by applying fusible vitreous material while maintaining the header in air at a temperature of a least 500° C., removing the copper oxide formed on the header during the sealing operation, electrolytically plating the shell with tin, placing the shell and header in non-contiguous juxtaposition in an evacuated enclosure, heating the shell to a degassing temperature without concurrently heating the header to a temperature materially above 300° C., and bringing the juxtaposed shell and header into abutting contact to provide a sealed joint between them by the flow of plating material on the said shell into the region of contact of the shell and header.

5. The method of fabricating a sealed electrical device which in finished condition includes two container-forming metal parts assembled in vacuum-tight relation and having lead-in conductors sealed through one of the parts only, which method comprises sealing the lead-in conductors through the said one part by the application of fusible vitreous material, applying fusible metal to at least one of the parts, supporting the parts in spaced relation under vacuum conditions, selectively heating the part which is devoid of lead-in conductors to a temperature on the order of 900° C. to remove occluded gases from the part while simultaneously maintaining the temperature of the other part below about 300° C., and bringing the two parts into contact without substantial cooling of the selectively heated part to form a sealed joint between them as a result of fusion of the said fusible metal by the heat retained in the last-named part.

JAMES E. BEGGS.